(12) United States Patent
Tanaka

(10) Patent No.: US 9,744,855 B2
(45) Date of Patent: Aug. 29, 2017

(54) VEHICLE AUXILIARY POWER SUPPLY

(75) Inventor: Takeshi Tanaka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 751 days.

(21) Appl. No.: 14/119,125

(22) PCT Filed: Jun. 30, 2011

(86) PCT No.: PCT/JP2011/065094
§ 371 (c)(1),
(2), (4) Date: Nov. 20, 2013

(87) PCT Pub. No.: WO2013/001646
PCT Pub. Date: Jan. 3, 2013

(65) Prior Publication Data
US 2014/0097670 A1    Apr. 10, 2014

(51) Int. Cl.
*B60L 1/00* (2006.01)
*B60L 3/00* (2006.01)
(Continued)

(52) U.S. Cl.
CPC .............. *B60L 1/00* (2013.01); *B60L 1/003* (2013.01); *B60L 3/0069* (2013.01); *B60L 3/04* (2013.01);
(Continued)

(58) Field of Classification Search
CPC .... B60L 1/00; B60L 1/003; B60L 9/22; B60L 9/28; B60L 3/0069; B60L 3/04; B60L 15/007; H02M 1/34
(Continued)

(56) References Cited

U.S. PATENT DOCUMENTS 5,740,025 A * 4/1998 Siegling, III ............ B60M 1/02
                                                             191/37
2008/0043500 A1* 2/2008 Asano ..................... H02M 1/34
                                                           363/56.12
(Continued)

FOREIGN PATENT DOCUMENTS

JP      7-031069 A    1/1995
JP   2002-051564 A    2/2002
(Continued)

OTHER PUBLICATIONS

See EAST Search History.*
(Continued)

*Primary Examiner* — Jared Fureman
*Assistant Examiner* — James Evans
(74) *Attorney, Agent, or Firm* — Buchanan Ingersoll & Rooney PC

(57) ABSTRACT

A vehicle auxiliary power supply that is mounted on a railway vehicle, includes a three-phase inverter circuit that converts DC power or AC power input from an overhead line to desired AC power to supply the AC power to a load, and is connected in parallel with a VVVF inverter device that drives a propulsion motor, wherein a blocking diode that prevents backflow from a side of the three-phase inverter circuit to a side of the overhead line is provided between the overhead line and the three-phase inverter circuit, and a SiC Schottky barrier diode is applied to the blocking diode.

4 Claims, 9 Drawing Sheets

(51) Int. Cl.
    *B60L 9/22*     (2006.01)
    *B60L 9/28*     (2006.01)
    *B60L 3/04*     (2006.01)
    *B60L 15/00*     (2006.01)

(52) U.S. Cl.
    CPC   *B60L 9/22* (2013.01); *B60L 9/28* (2013.01); *B60L 15/007* (2013.01); *B60L 2200/26* (2013.01); *B60L 2210/40* (2013.01); *B60L 2240/34* (2013.01); *Y02T 10/7241* (2013.01)

(58) Field of Classification Search
    USPC .......................................................... 307/9.1
    See application file for complete search history.

(56) References Cited

U.S. PATENT DOCUMENTS

| | | | |
|---|---|---|---|
| 2009/0015199 A1* | 1/2009 | Kitanaka ............ | B60L 11/1868 320/118 |
| 2010/0209748 A1 | 8/2010 | Kudo et al. | |
| 2010/0327837 A1 | 12/2010 | Tsugawa et al. | |

FOREIGN PATENT DOCUMENTS

| | | |
|---|---|---|
| JP | 2006-014489 A | 1/2006 |
| JP | 2007-049836 A | 2/2007 |
| JP | 2009-072027 A | 4/2009 |
| JP | 2010-193589 A | 9/2010 |
| JP | 2011-010404 A | 1/2011 |

OTHER PUBLICATIONS

International Search Report (PCT/ISA/210) mailed on Sep. 6, 2011, by the Japanese Patent Office as the International Searching Authority for International Application No. PCT/JP2011/065094.
Written Opinion (PCT/ISA/237) mailed on Sep. 6, 2011, by the Japanese Patent Office as the International Searching Authority for International Application No. PCT/JP2011/065094.
Office Action mailed on Oct. 8, 2013, by the Japanese Patent Office for Application No. 2013-522601.
"Proceedings of 43rd Railway Cybernetics Symposium", Congress of Japan Railway Cybernetics, Nov. 30, 2006, No. 512, p. 3.
Office Action (First Office Action) issued on Apr. 28, 2015, by the State Intellectual Property Office of the People's Republic of China in corresponding Chinese Patent Application No. 201180071871.7, and an English Language Translation of the Office Action. (13 pages).

* cited by examiner (MOMENT WHEN $E_S < V_{FC}$ IS MET)

(MOMENT WHEN $E_S < V_{FC}$ IS MET)

VEHICLE AUXILIARY POWER SUPPLY

FIELD

The present invention relates to a vehicle auxiliary power supply that supplies desired power to, for example, an air-conditioning system, a lighting system, and the like of a railway vehicle.

BACKGROUND

In a conventional vehicle auxiliary power supply, a configuration is typically such that a blocking diode is inserted between a pantograph and a filter capacitor that smooths a voltage applied from an overhead line via the pantograph, and a snubber circuit is provided in parallel with the blocking diode (see, for example, Non Patent Literature 1 described below).

Because many electrical devices having relatively large rated power are mounted on the railway vehicle, a large current flows to the blocking diode. Furthermore, during an operation of the railway vehicle, a current flows constantly to the blocking diode. Therefore, a cooler (for example, a cooling fin) is generally provided in the blocking diode so that the temperature of the blocking diode does not exceed a tolerance. The snubber circuit connected in parallel with the blocking diode inevitably becomes large due to the large capacity of the blocking diode.

CITATION LIST

Non Patent Literature

Non Patent Literature 1: "Proceedings of 43rd Railway Cybernetics Symposium", Congress of Japan Railway Cybernetics, Nov. 30, 2006, No. 512, p. 3, FIG. 5

SUMMARY

Technical Problem

As described above, in the conventional vehicle auxiliary power supply, the cooler for cooling the blocking diode and the snubber circuit for protecting the blocking diode, which are provided associated with the blocking diode inserted between the pantograph and the filter capacitor, need to be large although the size of the blocking diode is relatively small. Therefore, there are strong demands for downsizing the cooler and the snubber circuit provided associated with the blocking diode while maintaining the function as the vehicle auxiliary power supply.

The present invention has been achieved in view of the above, and an object of the present invention is to provide a vehicle auxiliary power supply that can downsize the cooler and the snubber circuit provided associated with the blocking diode.

Solution To Problem

In order to solve the above problems and achieve the object, a vehicle auxiliary power supply according to the present invention that is mounted on a railway vehicle, includes an inverter circuit that converts DC power or AC power input from an overhead line to desired AC power to supply the AC power to a load, and is connected in parallel with an inverter device that drives a propulsion motor, wherein a blocking diode that prevents backflow from a side of the inverter circuit to a side of the overhead line is provided between the overhead line and the inverter circuit, and the blocking diode is a Schottky barrier diode formed of a wide band semiconductor.

Advantageous Effects of Invention

According to the vehicle auxiliary power supply of the present invention, a cooler and a snubber circuit provided associated with a blocking diode can be downsized.

DESCRIPTION OF EMBODIMENTS

A vehicle auxiliary power supply according to the embodiments of the present invention will be explained below with reference to the accompanying drawings. The present invention is not limited to the embodiments.

Embodiment

Figure 1:
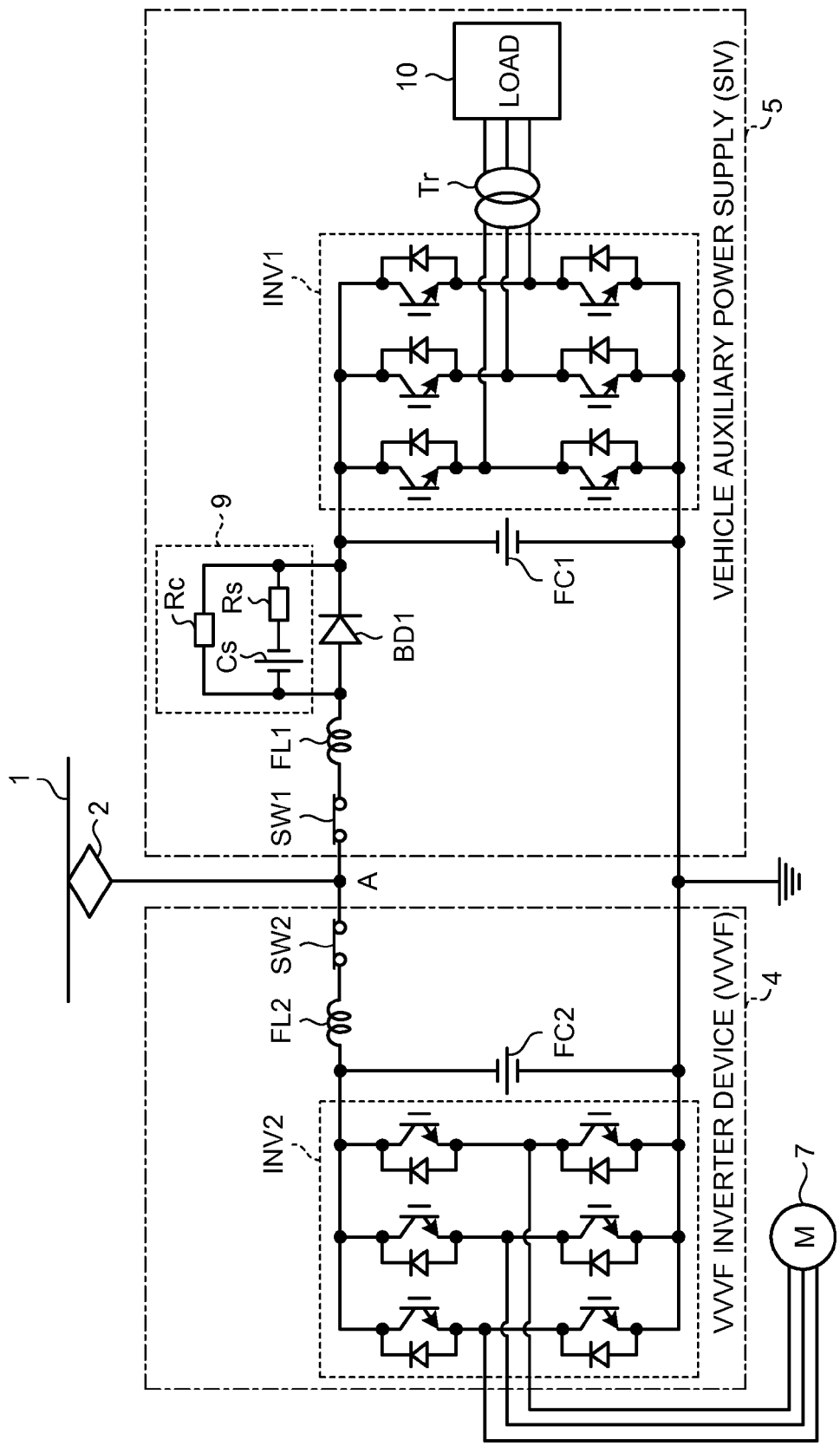
FIG. 1 is a simplified example of a main circuit configuration in a railway vehicle according to an embodiment.

FIG. 1 is a diagram illustrating a simplified example of a main circuit configuration in a railway vehicle according to an embodiment of the present application. As shown in FIG. 1, the main circuit in a railway vehicle is configured to include two main circuits. One of the main circuits is a circuit that forms a VVVF (Variable Voltage Variable Frequency) inverter device (hereinafter, simply "VVVF") 4 that controls a propulsion motor 7 by taking in DC power (for example, DC 750 (V) or DC 1500 (V)) supplied from an overhead line 1 via a pantograph 2 installed on the roof of the railway vehicle (hereinafter, simply "vehicle"). The other main circuit is a circuit that forms a vehicle auxiliary power supply (Static InVerter: SIV) 5 that is connected in parallel with the VVVF 4 and supplies desired power to in-vehicle electrical devices (hereinafter "load") 10 other than the propulsion motor 7, such as a lighting system, an air conditioning system, a compressor, a braking device, and a train-information processing device in the vehicle, by taking in the DC power from the overhead line 1 as in the VVVF 4.

The SIV 5 includes a three-phase inverter circuit INV1 in which a plurality of (three in the example shown in FIG. 1) pairs of series-connected upper and lower arms (switching devices) are connected in parallel, a filter capacitor FC1 connected in parallel to both ends (DC terminals) of the three-phase inverter circuit INV1, and a transformer Tr connected to an AC terminal of the three-phase inverter circuit INV1, and an output of the transformer Tr is supplied to the load 10.

The SIV 5 includes a switch SW1 that electrically disconnects the overhead line 1 from the main circuit, a filter reactor FL1 that is series-connected to the switch SW1 and smooths an input voltage to the three-phase inverter circuit INV1 together with the filter capacitor FC1, a blocking diode BD1 to prevent backflow of a current from a side of the SIV 5 to a side of the VVVF 4, and a snubber circuit 9 serving as a protection circuit of the blocking diode BD1. The snubber circuit 9 includes a snubber capacitor Cs, a snubber resistor Rs series-connected to the snubber capacitor Cs, and a discharge resistor Rc that discharges charge in the snubber capacitor Cs. A series circuit of the snubber capacitor Cs and the snubber resistor Rs, and the discharge resistor Rc are each connected in parallel across the blocking diode BD1.

The VVVF 4 includes a three-phase inverter circuit INV2 in which a plurality of (three in the example shown in FIG. 1) pairs of series-connected upper and lower arms (switching devices) are connected in parallel as in the SIV 5, a filter capacitor FC2 connected in parallel to both ends (DC terminals) of the three-phase inverter circuit INV2, a switch SW2 that electrically disconnects the overhead line 1 from the three-phase inverter circuit INV2, and a filter reactor FL2 that is series-connected to the switch SW2 and smooths an input voltage to the three-phase inverter circuit INV2 together with the filter capacitor FC2. The VVVF 4 drives the propulsion motor 7 by supplying an output of the three-phase inverter circuit INV2 to the propulsion motor 7.

In the example shown in FIG. 1, an example of an application to a DC overhead-line electric vehicle is shown. However, also in an AC overhead-line electric vehicle, the configuration and operation of a circuit part that converts an AC input to DC power by a converter to accumulate the DC power in a smoothing capacitor, and reconverts the accumulated DC power to AC power by the three-phase inverter circuit are the same or equivalent. Therefore, a similar application can be performed also to the AC overhead-line electric vehicle.

In the configuration shown in FIG. 1, the filter reactors (FL1, FL2) are provided in the VVVF 4 and the SIV 5, respectively. However, a configuration in which these filter reactors FL1 and FL2 are shared can be also used.

(Functions of Blocking Diode)

Next, functions of the blocking diode are explained with reference to FIGS. 2 to 4.

Figure 2:
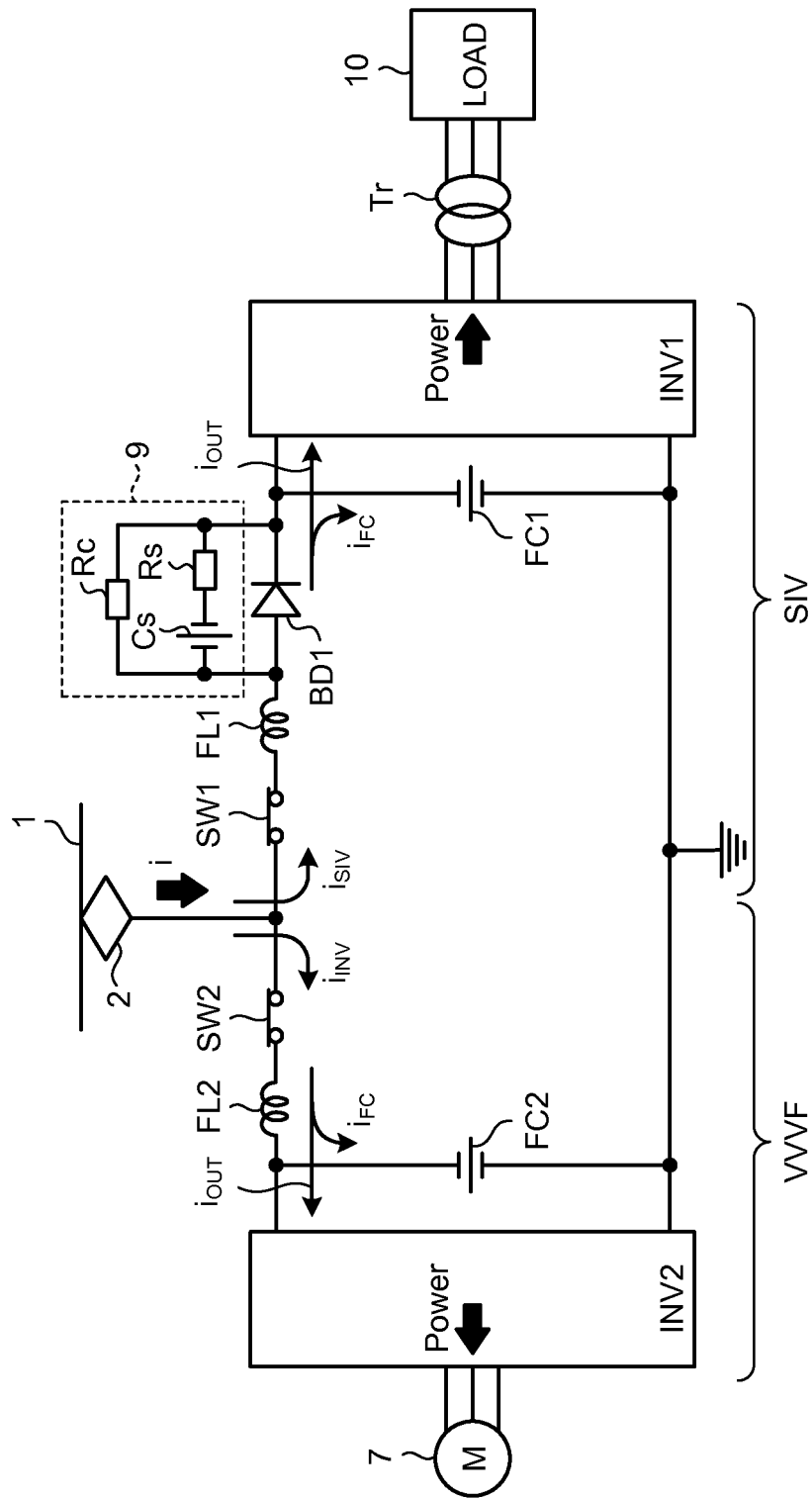
FIG. 2 is a diagram illustrating a normal operation state in the circuit configuration shown in FIG. 1.

FIG. 2 depicts a normal operation state of the circuit shown in FIG. 1. The pantograph 2 comes into contact with the overhead line 1, a current flows from the overhead line 1 to the SIV 5 via the pantograph 2, and power is supplied to the load 10 in the vehicle via the three-phase inverter circuit INV1 of the SIV 5. Similarly, a current flows to the VVVF 4 via the pantograph 2, and power is supplied to the propulsion motor 7 to control the vehicle in an accelerated state.

Figure 3:
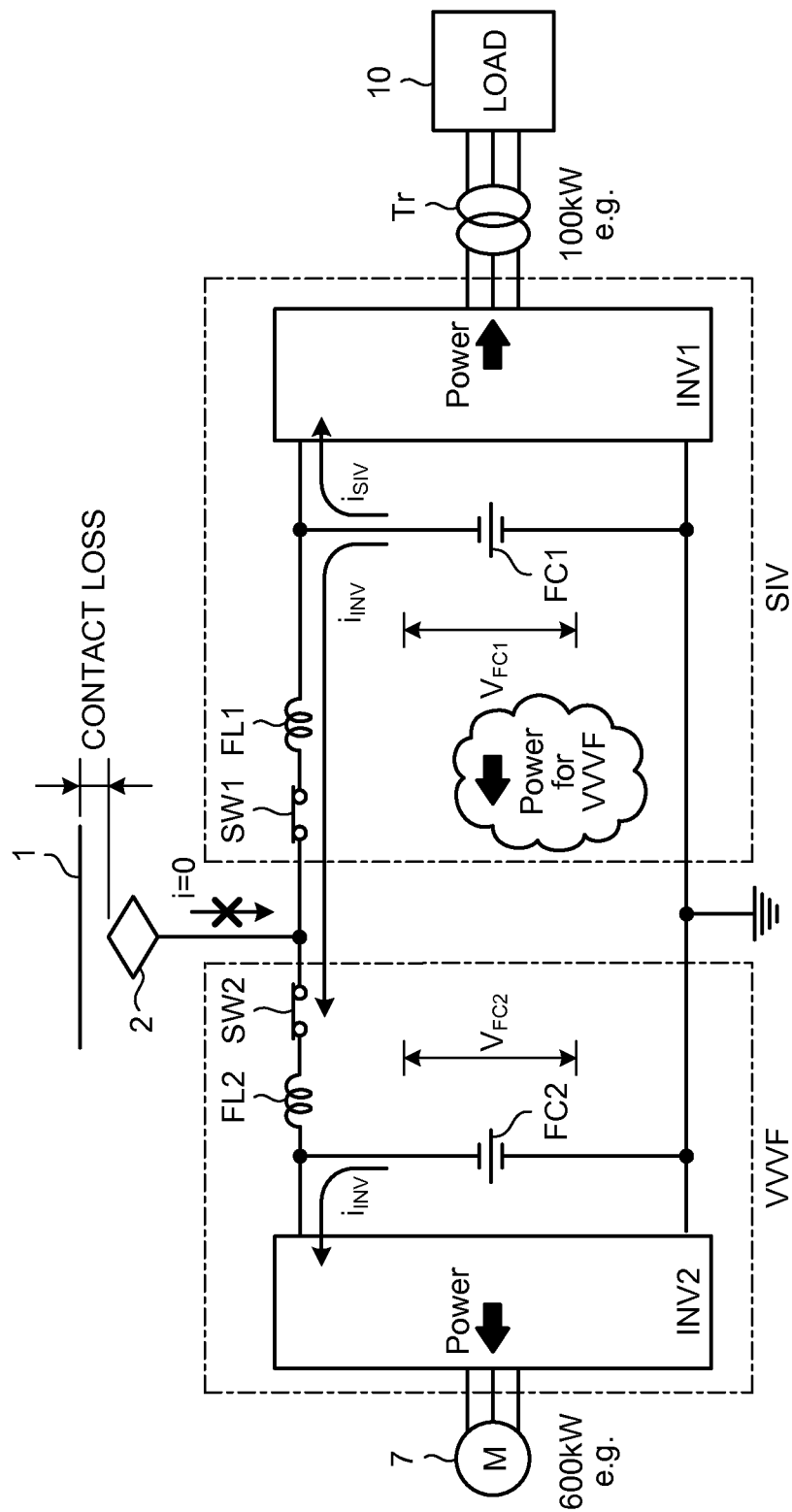
FIG. 3 is a diagram illustrating an operation state when there is no blocking diode in the configuration shown in FIG. 1.

FIG. 3 is a diagram illustrating an operation state when there is no blocking diode BD1 in the configuration shown in FIG. 1. For example, when the overhead line 1 and the pantograph 2 are separated from each other (hereinafter, "contact loss") in the state of FIG. 2, power supply to the propulsion motor 7 is performed by discharging the charge accumulated in the filter capacitor FC2 of the VVVF 4, and power supply to the load 10 is performed by discharging the charge accumulated in the filter capacitor FC1 of the SIV 5. The power supply to the propulsion motor 7 is continued until a voltage $V_{FC2}$ of the filter capacitor FC2 falls below an operation tolerance and thus the power supply cannot be performed. At this time, the charge in the filter capacitor FC1 of the SIV 5 is also supplied to the propulsion motor 7, which is a load of the VVVF 4. Generally, the power supplied to the VVVF 4 when the propulsion motor 7 is accelerated is larger than the power supplied to the load of the SIV 5, and thus a voltage $V_{FC1}$ of the filter capacitor FC1 of the SIV 5 drops rapidly to supply power to the side of the VVVF 4.

Meanwhile, even if the contact loss occurs, the SIV 5 needs to continue the operation to supply power to the load 10 continuously. To enable the SIV 5 to continue the operation during the contact loss, the filter capacitor FC1 having a large capacity needs to be prepared allowing for the amount of power to be supplied to the side of the VVVF 4.

Figure 4:
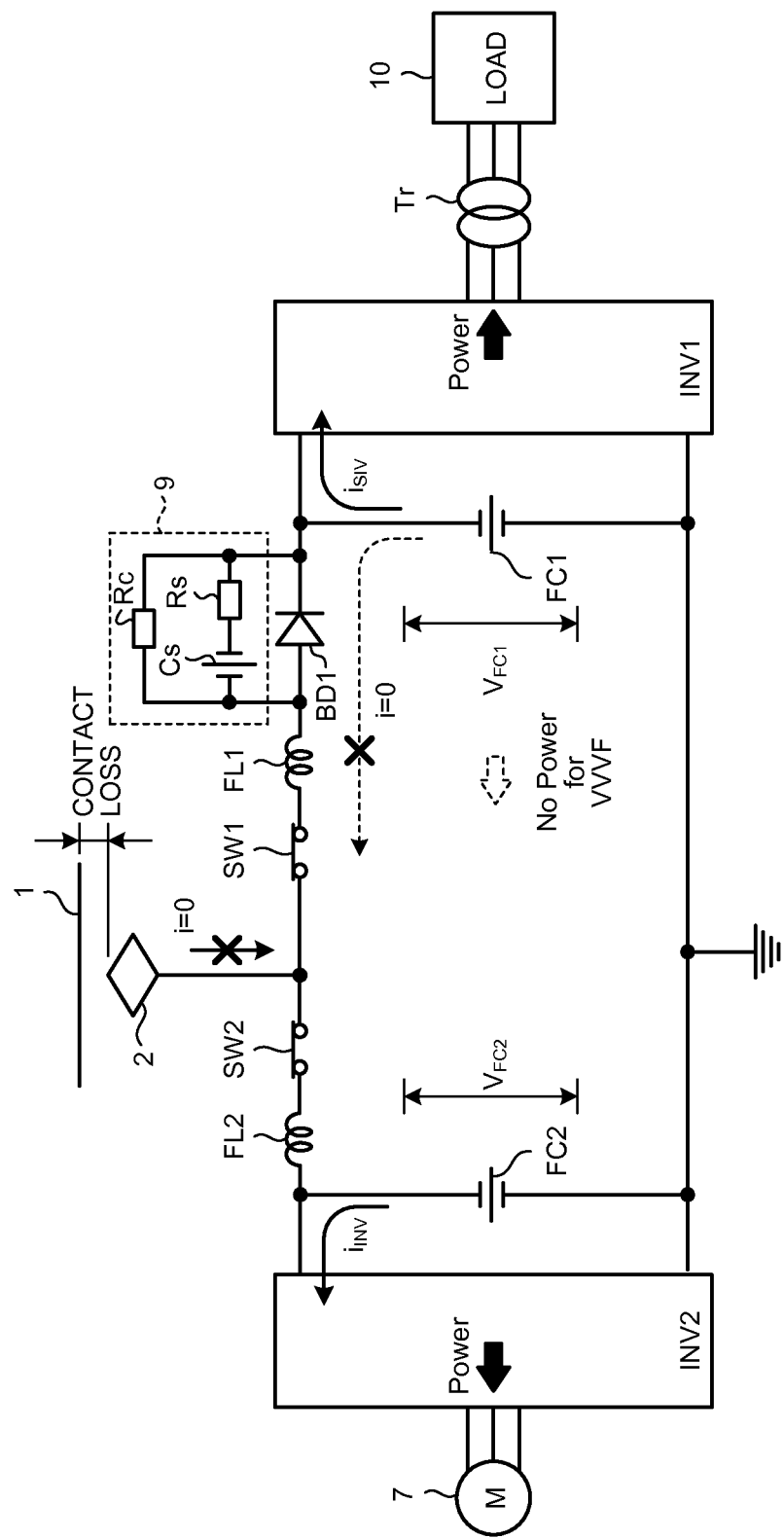
FIG. 4 is a diagram illustrating an operation state when the blocking diode is provided in contrast to FIG. 3.

FIG. 4 is a diagram illustrating an operation state when the blocking diode BD1 is provided. For example, when the pantograph 2 is separated from the overhead line 1 in the state shown in FIG. 2, discharge of the charge from the filter capacitor FC1 of the SIV 5 to the side of the VVVF 4 is blocked by the blocking diode BD1, and thus the filter capacitor FC1 of the SIV 5 discharges the charge only to a side of the load 10 of the SIV 5 during the contact loss. Therefore, the SIV 5 does not need to consider the power supply to the side of the VVVF 4, and the filter capacitor FC1 can be downsized. For this reason, the blocking diode BD1 is installed in the SIV 5.

(Recovery Operation of Blocking Diode in Conventional Technique)

Figure 5:
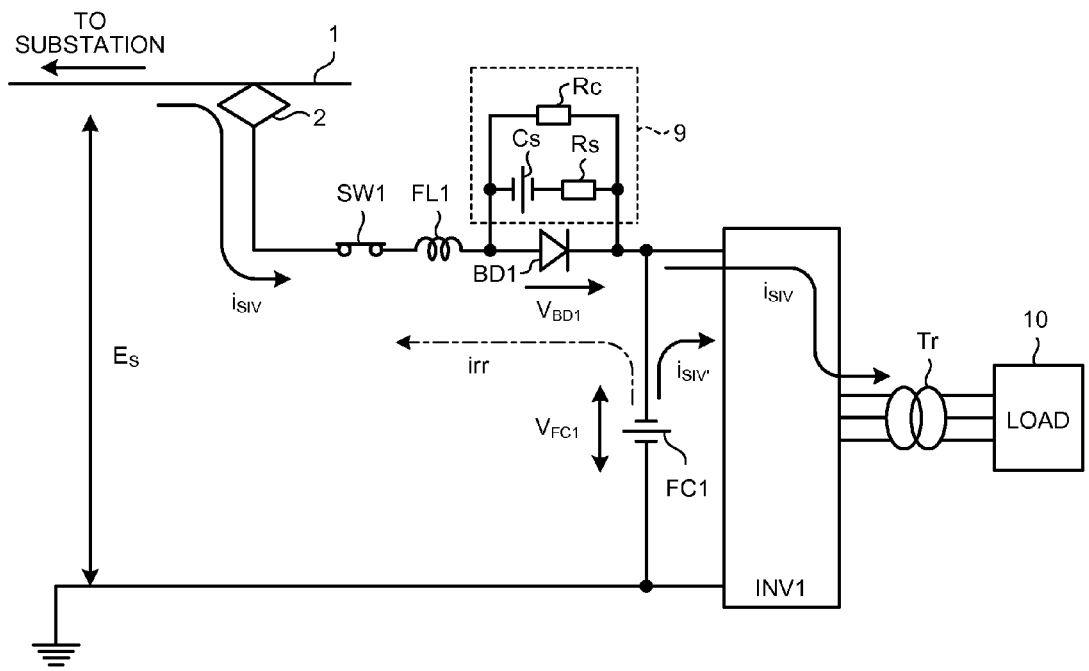
FIG. 5 is a schematic circuit diagram for explaining a recovery operation of the blocking diode in a conventional technique.
Figure 6:
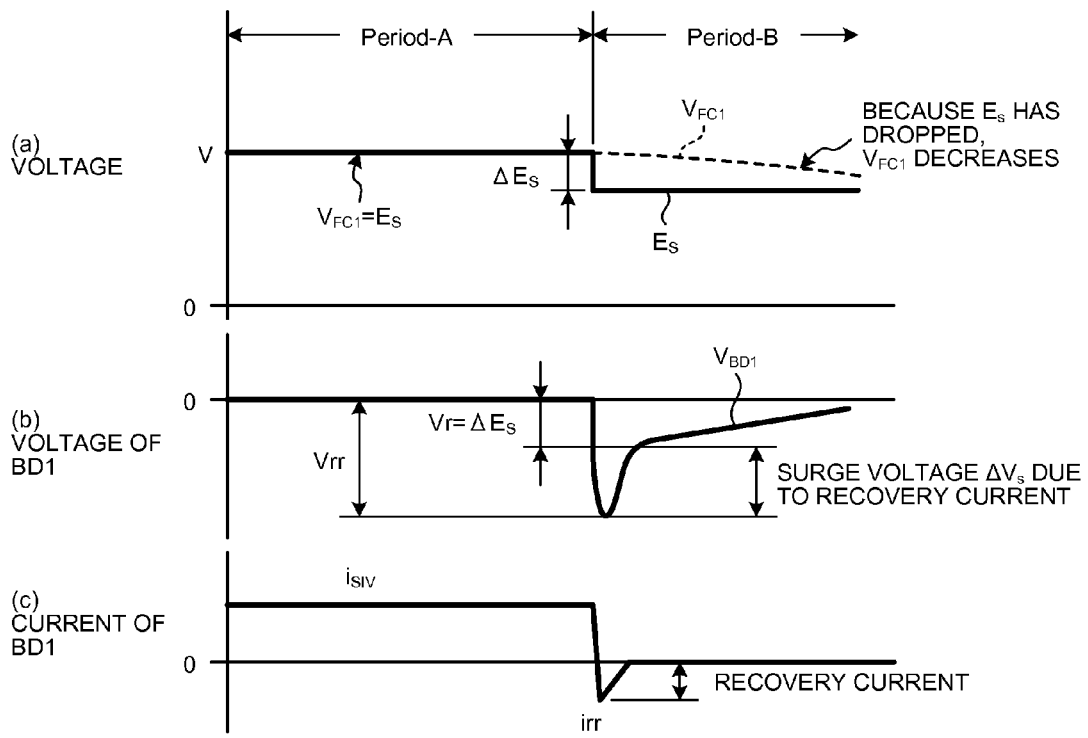
FIG. 6 is a time chart for explaining a recovery operation of the blocking diode in the conventional technique.

FIG. 5 is a schematic circuit diagram for explaining a recovery operation of the blocking diode BD1 in a conventional technique. FIG. 6 is a time chart for explaining a recovery operation of the blocking diode BD1 in the conventional technique. FIGS. 5 and 6 depict an operation performed, for example, when an overhead-line voltage $E_s$ has dropped suddenly by about several hundreds volts in a state where DC power is supplied from the overhead line 1 to the three-phase inverter circuit INV1 of the SIV 5 via the pantograph 2 and power is supplied from the three-phase inverter circuit INV1 to the load 10.

As shown in FIG. 5, when the overhead-line voltage $E_s$ has dropped sharply (at the time of shifting from "a Period-A" to "a Period-B") due to an abrupt change of the overhead-line voltage $E_s$ in a state where a current $i_{SIV}$ is flowing in a route of the filter reactor FL1→the blocking diode BD1→the three-phase inverter circuit INV1→the load 10 from the overhead line 1 via the pantograph 2, the overhead-line voltage $E_s$ momentarily becomes lower than the filter capacitor voltage $V_{FC1}$ charged to the filter capacitor FC1

(see FIG. 6(a)). Therefore, at the time of an overhead-line abrupt change, a difference voltage $V_r$ between the overhead-line voltage $E_s$ and the filter capacitor voltage $V_{FC1}$ is applied to the blocking diode BD1 as a reverse voltage (see FIG. 6(b)). At this time, a voltage in the opposite direction from the state where the current is flowing in the forward direction is applied to the blocking diode BD1. Therefore, a recovery current irr that flows in the opposite direction flows to the blocking diode BD1 momentarily (see FIG. 6(c)). A surge voltage $\Delta V_s$ generated by the product of a current change rate di/dt obtained when the recovery current irr disappears and an inductance of the circuit (that is, the sum of an inductance component of the filter reactor FL1 and a floating inductance component of the circuit) is superimposed on the difference voltage Vr. As a result, a voltage of $\Delta V_s + Vr = Vrr$ is applied to the blocking diode BD1 in the opposite direction (see FIG. 6(b)).

(Recovery Operation when Si Diode is Used for Blocking Diode)

Figure 7:
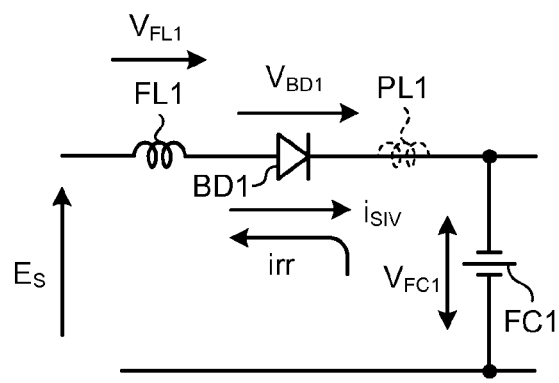
FIG. 7 is a schematic circuit diagram for explaining a recovery operation performed when a Si diode is used for the blocking diode.
Figure 8:
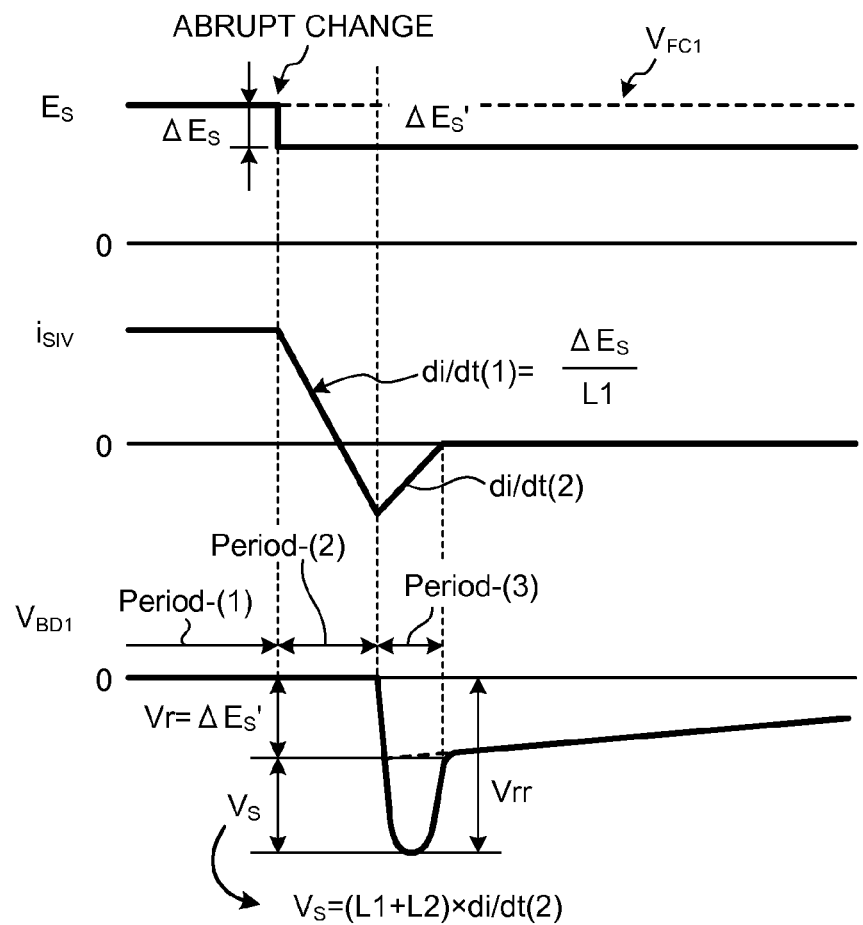
FIG. 8 is a time chart of a detailed operation state of a recovery operation performed when a Si diode is used for the blocking diode.

FIG. 7 is a schematic circuit diagram for explaining a recovery operation performed when a Si diode is used for the blocking diode BD1. FIG. 8 is a time chart of a detailed operation state of a recovery operation performed when a Si diode is used for the blocking diode BD1.

First, in a Period-(1), when the overhead line 1 is changed suddenly and the overhead-line voltage $E_s$ has dropped sharply from the state where the current $i_{SIV}$ is flowing in the forward direction from the overhead line 1 to the blocking diode BD1 via the filter reactor FL1, the overhead-line voltage $E_s$ becomes lower than the filter capacitor voltage $V_{FC1}$ ($E_s < V_{FC1}$), and the current $i_{SIV}$ flowing to the blocking diode BD1 in the forward direction decreases in a period-(2). At this time, the current $i_{SIV}$ decreases with an inclination of $-di/dt(1)$ determined by the relation between the magnitude of the difference voltage between the filter capacitor voltage $V_{FC1}$ and the overhead-line voltage $E_s$ and the inductance component in the current path. After the current $i_{SIV}$ falls below zero (ampere), the current $i_{SIV}$ increases as the recovery current irr in the negative direction with the same inclination of $-di/dt(1)$ (di/dt=(filter capacitor voltage $V_{FC1}$−overhead-line voltage $E_s$)/(inductance component of filter reactor FL1+inductance component of floating inductance PL1)=$(V_{FC1}-\Delta E_s)/(L1+L2)$).

The recovery current irr decreases with an inclination of $+di/dt(2)$ after having reached a peak (a negative peak) and becomes zero (ampere) (a Period-(3)). At this time, a reverse voltage $V_s = +(di/dt(2)) \times (L1+L2)$ is generated by the product of $+di/dt(2)$ and the inductance component in the circuit. On the other hand, after the abrupt change of the overhead-line voltage $E_s$ the value of the filter capacitor voltage $V_{FC1}$ slightly decreases due to the charge discharged during the Period-(2). When a difference between the filter capacitor voltage $V_{FC1}$ and the overhead-line voltage $E_s$ is assumed to be $\Delta E_s'$, the voltage Vrr applied to the blocking diode BD1 in the opposite direction becomes $Vrr = \Delta E_s' + V_s$.

(Circuit Operation when Ground Fault Occurs in Device Other than SIV 5)

Figure 9:
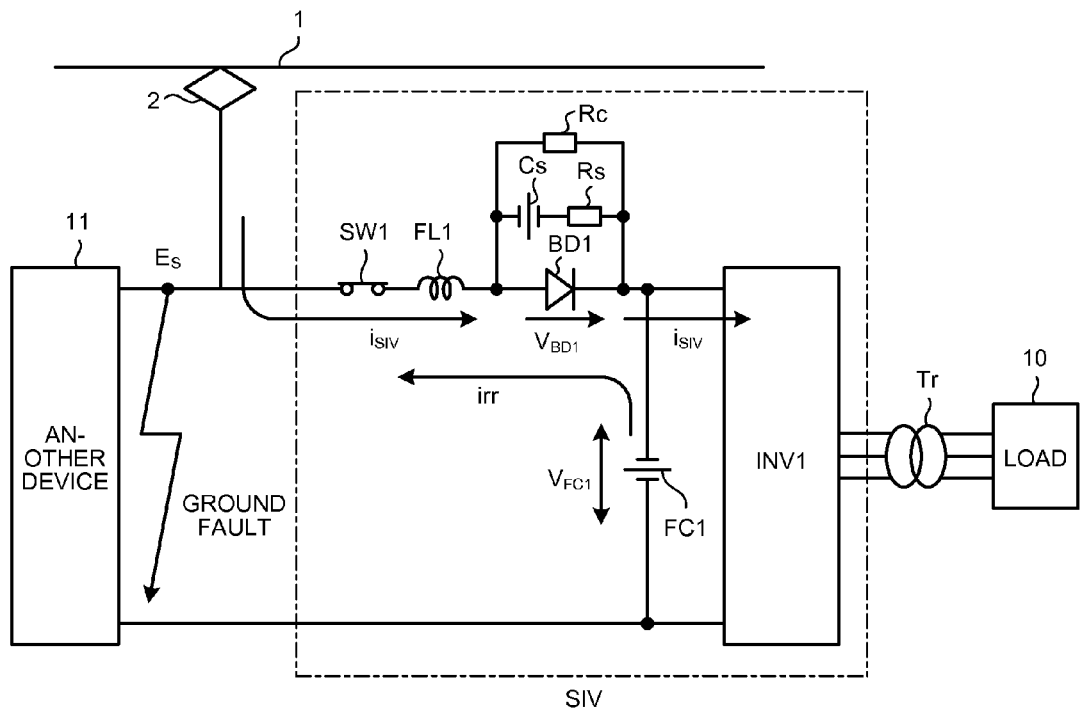
FIG. 9 is a diagram for explaining an operation performed when a ground fault occurs in a DC bus bar on a side of another device connected in parallel with an SIV.
Figure 10:
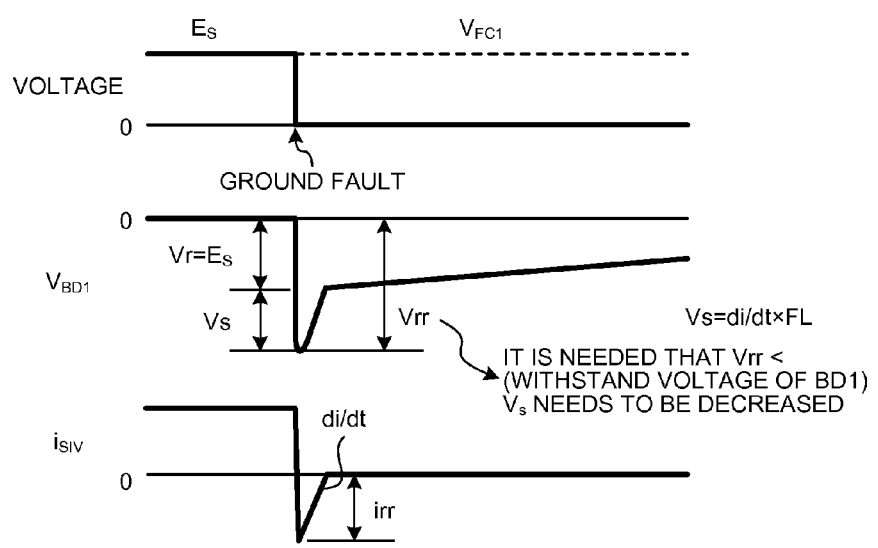
FIG. 10 is a time chart for explaining an operation performed when the ground fault shown in FIG. 9 occurs.

For example, as shown in FIG. 9, when a ground fault occurs in a DC bus bar on a side of another device 11 (for example, the VVVF 4) other than the SIV 5, connected in parallel with the SIV 5, the overhead-line voltage $E_s$ sharply drops to zero (volt). At this time, as explained with reference to FIGS. 7 and 8, the reverse applied voltage Vrr to the blocking diode BD1 becomes $Vrr = E_s + V_s$ as shown in FIG. 10, due to a recovery operation phenomenon of the blocking diode BD1.

The blocking diode BD1 needs to have a sufficiently high withstand voltage not to be broken due to the voltage Vrr. Therefore, a diode having a higher withstand voltage needs to be selected as the reverse voltage $V_s$ becomes higher, and, of course, the blocking diode BD1 needs to be designed not to be broken even in an external abnormal condition such as a ground fault. Therefore, in the circuit design of the SIV 5 including the blocking diode BD1, consideration is required so that the reverse voltage $V_s$ becomes as small as possible.

(Operation of Snubber Circuit in Conventional Technique)

As described above, a decrease in the reverse voltage $V_s$ largely affects the selection of the blocking diode BD1. To decrease the reverse voltage $V_s$, (+di/dt(2)), which is the current change rate after the recovery, needs to be as small as possible.

Figure 11:
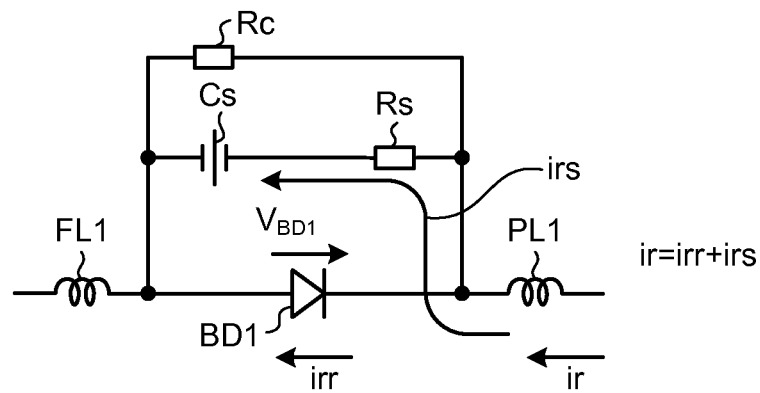
FIG. 11 is a circuit diagram for explaining an effect of the snubber circuit.
Figure 12:
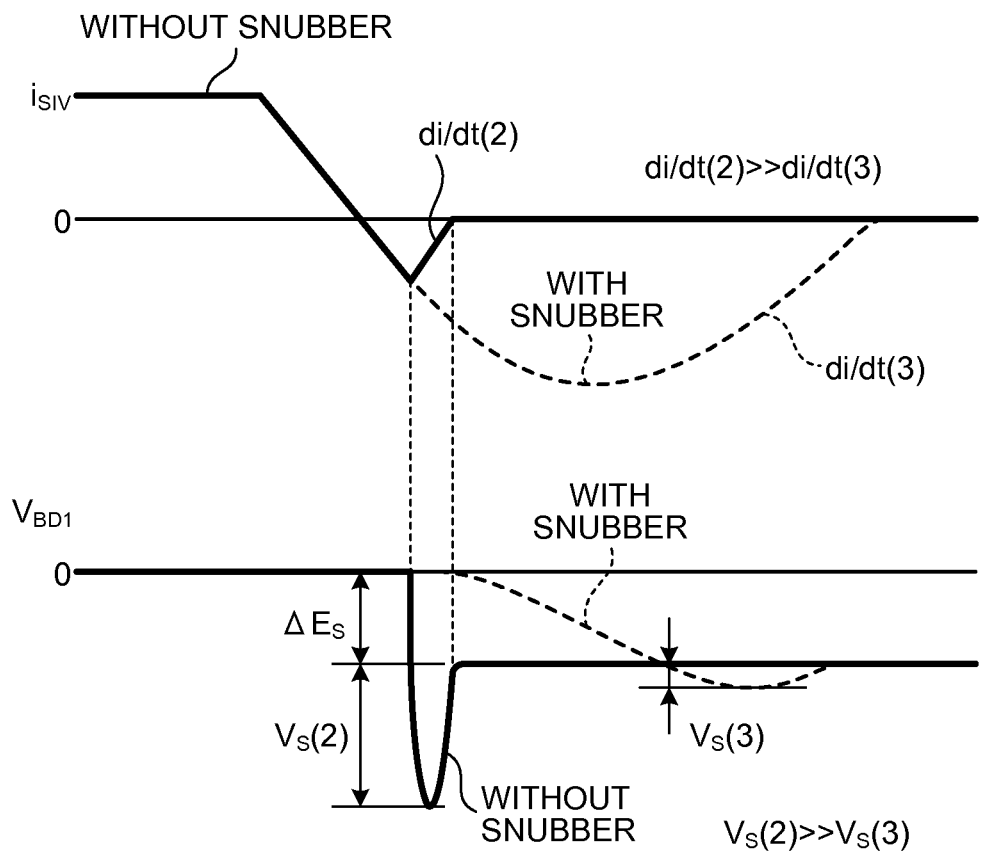
FIG. 12 is a time chart for explaining the effect of the snubber circuit.

FIG. 11 is a circuit diagram for explaining an effect of the snubber circuit, and FIG. 12 is a time chart for explaining the effect of the snubber circuit. In FIG. 12, waveforms represented by thick solid lines are the current ($i_{SIV}$) and the voltage ($V_{BD1}$) when the snubber circuit is not provided. As shown in FIG. 11, by connecting the snubber capacitor Cs in parallel with the blocking diode BD1, a current it at the time of recovery is also shunted to the snubber capacitor side (irs in FIG. 11) as well as to the blocking diode BD1 in the opposite direction. Due to this effect, +di/dt(2) (a waveform represented by a solid line in FIG. 12) at the time of recovery determined by the diode characteristic of the blocking diode BD1 becomes +di/dt(3) (a waveform represented by a broken line in FIG. 12) determined by resonance between the snubber capacitor Cs and the inductance component of the circuit (the inductance component L1 of the filter reactor FL1+the inductance component L2 of the floating inductance PL1). At this time, by selecting the snubber capacitor Cs having a sufficiently large capacity with respect to a charge amount that determines the recovery characteristic of the blocking diode BD1, the value of +di/dt(3) can be decreased to be extremely smaller than the value of +di/dt(2) (di/dt(2)>>di/dt(3)). As a result, the reverse voltage $V_S$ determined by the product of di/dt and the inductance component of the circuit can establish a relation of $V_S(2) >> V_S(3)$ between a reverse voltage $V_S(2)$ in the case of providing no snubber circuit and a reverse voltage $V_S(3)$ in the case of providing the snubber circuit. In this manner, by providing the snubber capacitor Cs, the reverse voltage $V_S$ can be decreased, and as for the withstand voltage of the blocking diode BD1, a reasonable high withstand voltage product can be selected.

In the snubber circuit according to the present embodiment, because the resonance with the filter reactor FL1 is sustained only with the snubber capacitor Cs, the snubber resistor Rs is arranged in series with the snubber capacitor Cs, as shown in FIGS. 1 and 11 and the like, to prevent the resonance from continuing. Furthermore, to discharge the charge in the snubber capacitor Cs after the snubber capacitor Cs is charged, the discharge resistor Rc is arranged in parallel with the series circuit of the snubber capacitor Cs and the snubber resistor Rs. When there is no discharge resistor Rc, the charge in the snubber capacitor Cs is blocked by the blocking diode BD1 and cannot be discharged.

(Problem in Conventional Technique)

Because a conventional SIV is configured as described above, and a silicon-based plane diode (a planar diode) is used in the conventional technique, the recovery current is large. Therefore, to cause the blocking diode to have a reasonable withstand voltage, a large snubber capacitor needs to be connected to suppress the surge voltage generated by the recovery current. The discharge resistor for discharging the charge accumulated in this type of snubber capacitor also becomes large depending on the capacity or the size of the snubber capacitor.

In the SIV, at the time of a normal operation, a forward current constantly flows to the blocking diode, and conduction loss occurs constantly. Therefore, the blocking diode becomes a factor that decreases efficiency of the SIV. Furthermore, in the SIV, a cooler that cools the blocking diode is required in addition to the snubber circuit, and thus the device becomes large and cost increases.

On the other hand, the blocking diode having an extremely high withstand voltage to the overhead-line voltage is required to reduce the size of the snubber circuit or to omit the snubber circuit. However, in this case, there is a defect that the diode becomes expensive. When this type of diode is used, the forward voltage also increases and thus there is a problem that the conduction loss increases. Therefore, use of the blocking diode having a high withstand voltage leads to an expensive diode, a large cooler, an increase in the conduction loss, and the like, and therefore an advantage that the snubber circuit can be omitted is not effectively utilized at all.

When a silicon (Si)-based Schottky barrier diode is used, the forward voltage decreases and the conduction loss can be reduced. However, in the silicon-based Schottky barrier diode, the withstand voltage cannot be increased. Therefore, to apply the silicon-based Schottky barrier diode to a high withstand voltage use such as a 750-V overhead line or a 1500-V overhead line as an application for the railway vehicle, diode elements need to be arranged in parallel and in series, and thus the device becomes large and expensive, and loss increases.

(Summary and Technical Explanations of Embodiment of Present Application)

To solve the various problems and restrictions described above, according to the embodiment of the present application, a silicon carbide (SiC)-based Schottky barrier diode is applied to the blocking diode of the SIV. In the SiC Schottky barrier diode, the forward voltage is lower than that of the silicon planar diode, thereby enabling the conduction loss to be decreased, and ideally, any recovery current does not flow. Therefore, the snubber circuit can be downsized or it can be omitted.

Figure 13:
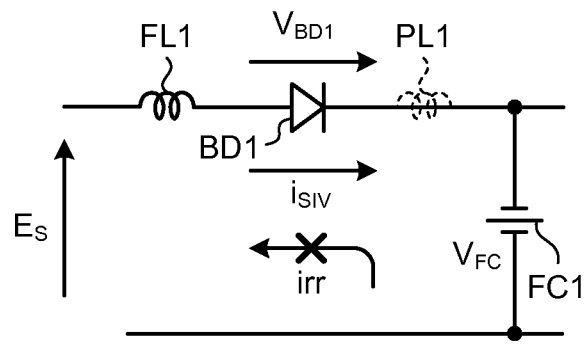
FIG. 13 is a simplified circuit diagram for explaining a recovery operation performed when a SiC Schottky barrier diode is used as the blocking diode.
Figure 14:
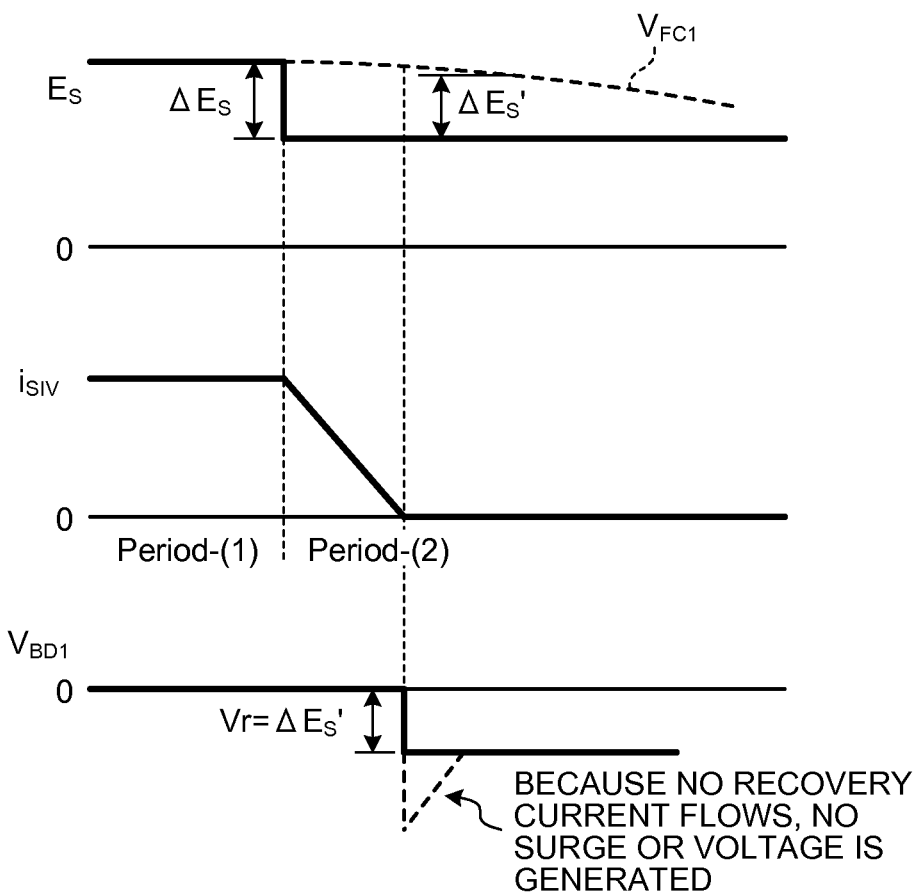
FIG. 14 is a time chart of a detailed operation state of the recovery operation performed when the SiC Schottky barrier diode is used as the blocking diode.

FIG. 13 is a simplified circuit diagram for explaining a recovery operation performed when a SiC Schottky barrier diode is used as the blocking diode. FIG. 14 is a time chart of a detailed operation state of the recovery operation performed when the SiC Schottky barrier diode is used as the blocking diode.

First, as shown in FIG. 14, an operation from the Period-(1) in which a forward current is flowing from the overhead line 1 to the blocking diode BD1 via the pantograph 2 to the Period-(2) in which the overhead-line voltage $E_S$ has dropped sharply due to an abrupt change of the overhead line, or the like is the same as that explained in the section of the conventional technique. On the other hand, when the SiC Schottky barrier diode is used, because any recovery current does not flow after the current of the SIV becomes zero (ampere) at the end of the Period-(2) (see FIG. 13), the reverse applied voltage Vrr to be applied to the blocking diode BD1 becomes only a difference voltage between the overhead-line voltage $E_S$ and the filter capacitor voltage $V_{FC1}$ after the Period-(2), that is, the reverse applied voltage Vrr becomes only Vrr≈Vr=$E_S$-$V_{FC1}$.

More specifically, for example, even when the overhead-line voltage $E_S$ suddenly becomes zero (volt) due to a bus ground fault caused by devices other than the SIV, or the like, ideally, a voltage equal to or larger than the overhead-line voltage $E_S$ is not applied to the blocking diode BD1. Accordingly, the withstand voltage of the blocking diode BD1 needs only to be slightly higher than the overhead-line voltage $E_S$.

Accordingly, when the SiC Schottky barrier diode is used for the blocking diode BD1, ideally, the snubber circuit including the snubber capacitor Cs, the snubber resistor Rs, and the discharge resistor Rc is not required. A slight surge voltage may be generated due to an influence of a floating capacitance in the circuit or the like. Therefore, the snubber circuit may be required in some cases depending on the circuit configuration or the characteristic of the SiC Schottky barrier diode. However, even in this case, the size, the capacity, and the like of the snubber circuit, that is, the snubber capacitor Cs and the snubber resistor Rs can be reduced.

Effects of Embodiment of Present Application

As described above, according to the vehicle auxiliary power supply of the present embodiment, the blocking diode that prevents backflow from the inverter circuit side to the overhead line side is provided between the overhead line and the inverter circuit, and the SiC Schottky barrier diode is applied to the blocking diode. Therefore, an effect can be obtained where the snubber circuit that protects the blocking diode can be omitted, or the size thereof can be decreased as small as possible.

Furthermore, by using the SiC Schottky barrier diode as the blocking diode, an effect can be obtained where the withstand voltage of the blocking diode can be decreased to such a level that a general-purpose product can be selected.

Because the forward voltage of the SiC is lower than that of silicon, and an allowable operating temperature thereof is significantly higher than silicon, an effect can be obtained where a heat dissipation fin of the cooler can be made extremely small, thereby enabling to contribute to downsizing of the device and cost reduction.

SiC is an example of semiconductors referred to as a "wide bandgap semiconductor" because of the characteristic such that a bandgap is larger than Si. In addition to SiC, a semiconductor formed by using, for example, a gallium nitride (GaN)-based material or diamond (C) also belongs to the wide bandgap semiconductor, and the characteristics thereof have a lot of similarities to those of SiC. Therefore, configurations using wide bandgap semiconductors other than SiC are also included within the scope of the present application.

While an example in which the main circuit of the auxiliary power supply is a three-phase circuit has been explained above, similar effects can be obviously achieved to an auxiliary power supply that outputs a single-phase alternate current or a direct current.

INDUSTRIAL APPLICABILITY

As described above, the vehicle auxiliary power supply according to the present invention is useful as an invention that can further downsize the cooler and the snubber circuit provided associated with the blocking diode.

REFERENCE SIGNS LIST 1 overhead line
2 pantograph

4 VVVF inverter device (VVVF)
5 vehicle auxiliary power supply (SIV)
7 propulsion motor
9 snubber circuit
10 load
11 another device
BD1 blocking diode
FC1, FC2 filter capacitor
FL1, FL2 filter reactor
INV1, INV2 three-phase inverter circuit
PL1 floating inductance
Cs snubber capacitor
Rc discharge resistor
Rs snubber resistor
SW1, SW2 switch
Tr transformer

The invention claimed is:

1. A vehicle auxiliary power supply that is mounted on a railway vehicle, includes an inverter circuit that converts power input from an overhead line to desired AC power to supply the AC power to a load, and is connected in parallel with an inverter device that drives a propulsion motor, wherein a blocking diode that prevents backflow from a side of the inverter circuit to a side of the overhead line and a filter reactor that smooths an input voltage to the inverter circuit are provided between the overhead line and the inverter circuit, and the blocking diode is a Schottky barrier diode formed of a wide bandgap semiconductor, wherein a snubber circuit is provided in parallel with the blocking diode, and the snubber circuit includes a first resistor in parallel with a series connection of a second resistor and a capacitor.

2. The vehicle auxiliary power supply according to claim 1, wherein the wide bandgap semiconductor is a semiconductor using silicon carbide, a gallium nitride-based material, or diamond.

3. A vehicle auxiliary power supply that is mounted on a railway vehicle and includes an inverter circuit that converts power input from an overhead line to desired AC power to supply the AC power to a load, wherein a blocking diode that prevents backflow from a side of the inverter circuit to a side of the overhead line and a filter reactor that smooths an input voltage to the inverter circuit are provided between the overhead line and the inverter circuit, and the blocking diode is a Schottky barrier diode formed of a wide bandgap semiconductor, wherein a snubber circuit is provided in parallel with the blocking diode, and the snubber circuit includes a first resistor in parallel with a series connection of a second resistor and a capacitor.

4. The vehicle auxiliary power supply according to claim 3, wherein the wide bandgap semiconductor is a semiconductor using silicon carbide, a gallium nitride-based material, or diamond.

* * * * *